(12) United States Patent
Beskrovny et al.

(10) Patent No.: US 10,785,246 B2
(45) Date of Patent: *Sep. 22, 2020

(54) MINING ATTACK VECTORS FOR BLACK-BOX SECURITY TESTING

(71) Applicant: International Business Machines Corporation, Armonk, NY (US)

(72) Inventors: Evgeny Beskrovny, Ramat Gan (IL); Omer Tripp, Har-Adar (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 804 days.

This patent is subject to a terminal disclaimer.

(21) Appl. No.: 14/023,559

(22) Filed: Sep. 11, 2013

(65) Prior Publication Data

US 2014/0082737 A1    Mar. 20, 2014

Related U.S. Application Data

(63) Continuation of application No. 13/623,067, filed on Sep. 19, 2012.

(51) Int. Cl.
*H04L 29/06* (2006.01)
(52) U.S. Cl.
CPC ........ *H04L 63/1433* (2013.01); *H04L 63/168* (2013.01)
(58) Field of Classification Search
None
See application file for complete search history.

(56) References Cited

U.S. PATENT DOCUMENTS

| | | | |
|---|---|---|---|
| 7,849,448 B2 | 12/2010 | Yunus et al. | |
| 7,984,501 B2* | 7/2011 | Zaninotti | 726/23 |
| 2006/0277606 A1* | 12/2006 | Yunus et al. | 726/25 |
| 2006/0282897 A1* | 12/2006 | Sima et al. | 726/25 |
| 2009/0205047 A1 | 8/2009 | Podjarny | |
| 2010/0169974 A1 | 7/2010 | Calendino et al. | |
| 2011/0239104 A1 | 9/2011 | Prasad et al. | |
| 2013/0160130 A1* | 6/2013 | Mendelev et al. | 726/25 |

(Continued)

FOREIGN PATENT DOCUMENTS

WO    2009023715 A1    2/2009

OTHER PUBLICATIONS

Xiong, P. and Peyton, L., Aug. 17-19, 2010, "A Model-Driven Penetration Test Framework for Web Applications," 2010 Eighth Annual International Conference on Privacy, Security and Trust.*

(Continued)

*Primary Examiner* — Kaveh Abrishamkar
(74) *Attorney, Agent, or Firm* — Cuenot, Forsythe & Kim, LLC

(57) ABSTRACT

Black-box security testing for a Web application includes identifying infrastructure supporting the Web application, obtaining vulnerability data for the Web application from an external data source according to the infrastructure, deriving a test payload from the vulnerability data using a processor, and determining a type of vulnerability exploited by the test payload. An existing validation operation of a testing system is selected for validating a response from the Web application to the test payload according to the type of vulnerability.

10 Claims, 2 Drawing Sheets

(56) References Cited

U.S. PATENT DOCUMENTS

| | | |
|---|---|---|
| 2013/0247204 A1 | 9/2013 | Schrecker et al. |
| 2013/0247206 A1* | 9/2013 | Hugard et al. ................ 726/25 |
| 2014/0082735 A1 | 3/2014 | Beskrovny et al. |

OTHER PUBLICATIONS

OWASP Top 10: The 10 Most Critical Web Application Security Vulnerabilities, 2007 Update. OWASP Foundation, 2007 [retrieved on Jul. 6, 2018]. Retrieved from the Internet: <URL: https://www.owasp.org/images/e/e8/OWASP_Top_ 10 2007.pdf>. (Year: 2007) (Year: 2007).*

U.S. Appl. No. 13/623,067, Non-final Office Action, dated Feb. 14, 2014, 16 pg.

McAllister, S. et al., "Leveraging User Interactions for In-Depth Testing of Web Applications," [Online] RAID '08 Proc. of 11th Int'l. Sym. on Recent Advances in Intrusion Detection, vol. 5230/2008, pp. 191-210, 2008, retrieved from the Internet:<www.cs.ucsb.edu/~chris/research/doc/raid08_xss.pdf>.

Karanth, S. et al., "Pattern mining for future attacks," [Online] Microsoft Research, Technical Report MSR-TR-2010-100, 2010, 10 pgs., retrieved from the Internet: <research.microsoft.com/pubs/135599/mainpaper.pdf>.

Huang, Y.W. et al., "Web application security assessment by fault injection and behavior monitoring," WWW '03 Proc. of 12th Int'l. Conf. on World Wide Web, pp. 148-159, May 20-24, 2003, retrieved from the Internet: <http://dl.acm.org/citation.cfm?id=775152.775174>.

Eisenbarth, M. et al., "Active Exploit Detection," [online] HP Tipping Point, Hewlett-Packard Development Company, LP, Jan. 7, 2011, 12 pgs., retrieved from the Internet: <https://media.blackhat.com/Blackhat_DC_2011_Eisenbarth_Active_Exploit-wp.pdf>.

Ektefa, M. et al., "Intrusion detection using data mining techniques," Int'l. Conf. on Information Retrieval and Knowledge Management, (CAMP), Mar. 17-18, 2010, pp. 200-203, retrieved from the Internet: <http://ieeexplore.ieee.org/xpl/freeabs_all.jsp?arnumber=5466919>.

Sectechno, "Web Application Attack and Audit Framework 1.0 Released," [online] Infosec Island, LLC, Jun. 3, 2011, 4 pgs., [retrieved Sep. 18, 2012] retrieved from the Internet: <https://www.infosecisland.com/blogview/14161-Web-Application-Attack-and-Audit-Framework-10-Released.html>.

* cited by examiner

US 10,785,246 B2

MINING ATTACK VECTORS FOR BLACK-BOX SECURITY TESTING

CROSS-REFERENCE TO RELATED APPLICATIONS

This application is a Continuation of U.S. application Ser. No. 13/623,067, filed on Sep. 19, 2012, the entirety of which is incorporated herein by reference.

BACKGROUND

Black-box security testing refers to a testing technique for determining whether a Web application has one or more security vulnerabilities. Typically, black-box testing involves initiating an attack on the Web application under test and observing the response from the Web application. The response is compared with a model response. The result of the comparison indicates whether the Web application is vulnerable to the attack.

In general, the attacks that are initiated by conventional testing systems are hardcoded. The testing system, for example, determines various attributes of the Web application under test and, based upon those attributes, retrieves particular tests (i.e., attacks) from an internal database to initiate against the Web application.

Maintaining and updating the tests is a time consuming and cumbersome process for developers of the testing system. Even in cases where the testing system is kept up-to-date from a development point of view, there is no guarantee that end users of the testing system will exercise diligence in obtaining and installing updates for the testing system when used.

BRIEF SUMMARY

An embodiment can include a method. The method includes identifying infrastructure supporting a Web application, obtaining vulnerability data for the Web application from an external data source according to the infrastructure, deriving a test payload from the vulnerability data using a processor, and determining a type of vulnerability exploited by the test payload. An existing validation operation of a testing system is selected for validating a response from the Web application to the test payload according to the type of vulnerability.

Another embodiment can include a system having a processor. The processor can be configured to initiate executable operations. The executable operations include identifying infrastructure supporting a Web application, obtaining vulnerability data for the Web application from an external data source according to the infrastructure, deriving a test payload from the vulnerability data using a processor, and determining a type of vulnerability exploited by the test payload. An existing validation operation of a testing system is selected for validating a response from the Web application to the test payload according to the type of vulnerability.

Another embodiment can include a computer program product. The computer program product includes a computer-readable storage medium having stored thereon program code that, when executed, configures a processor to perform operations. The operations include identifying infrastructure supporting a Web application, obtaining vulnerability data for the Web application from an external data source according to the infrastructure, deriving a test payload from the vulnerability data using a processor, and determining a type of vulnerability exploited by the test payload. An existing validation operation of a testing system is selected for validating a response from the Web application to the test payload according to the type of vulnerability.

DETAILED DESCRIPTION

Figure 1:
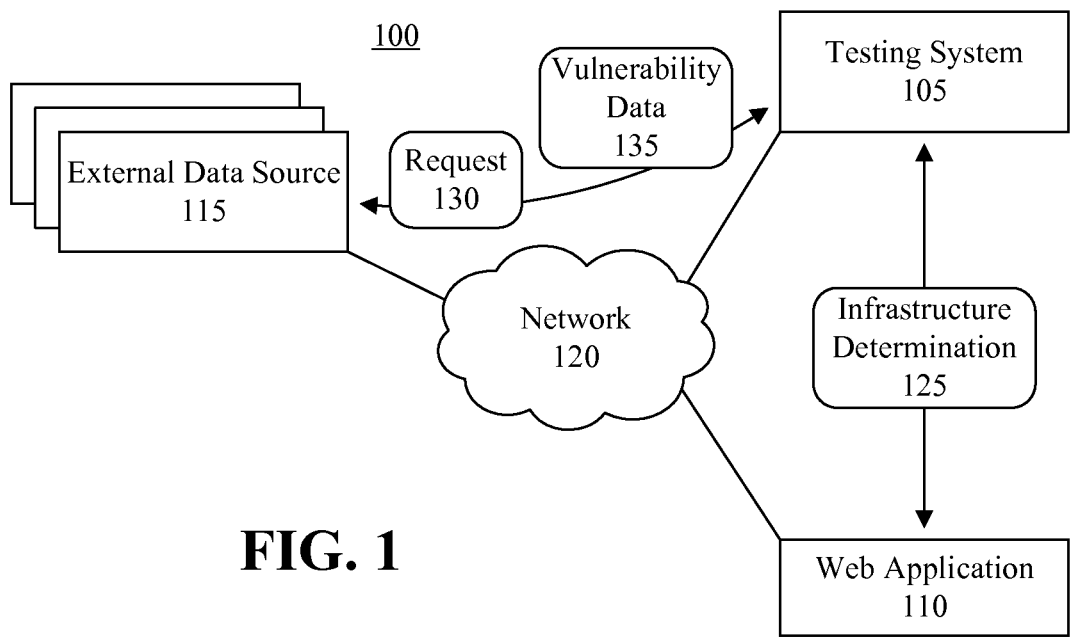
FIG. 1 is a block diagram illustrating an example of a computing environment for testing a Web application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments disclosed within this specification relate to black-box testing of a Web application and, more particularly, to utilizing external data sources to determine attack vectors for use in testing the Web application. In accordance with the inventive arrangements disclosed within this specification, a testing system searches one or more external data sources for vulnerability data that becomes available for a given Web application. The vulnerability data can be obtained by the testing system and used to derive a test payload that is used in attacking the Web application during black-box testing.

The testing system undertakes an analysis to determine the particular vulnerability that the test payload is intended to exploit in the Web application. In cases where the type of vulnerability is identifiable by the testing system, the testing system can locate a validation operation that exists in the testing system that is used for validating Web application responses in other tests, e.g., test payloads, intended to exploit the same or like type of vulnerability.

A "payload" refers to the actual data that is that is sent as part of a data transmission such as a request conveyed over a network. The payload is the part of the data transmission that is the fundamental purpose of the transmission and does not include other portions of a transmission such as headers, metadata, or the like. A request and a response are data transmissions in that a request and a response refers to the entirety of the data that is sent, e.g., the payload inclusive of headers, metadata, and the like.

FIG. 1 is a block diagram illustrating an example of a computing environment 100 for testing a Web application. As shown, computing environment 100 includes a testing system 105, a Web application 110 that is under test, and one or more external data sources 115. Testing system 105, Web application 110, and external data source 115 are communicatively linked, e.g., connected, via network 120. Network 120 can be implemented as any of variety of public and/or private networks including various combinations of such networks. For example, network 105 can be implemented as, or include, the Internet, a LAN, a WAN, one or more wireless networks such as mobile networks or local networks, etc.

Web application 110 is be implemented as a Website or other application accessible over a network such as network 120. Web application 110 executes on one or more data processing systems, e.g., servers, coupled to network 120 (not shown). Web application 110 is configured to receive requests from client systems and provide responses to the requests. Each request received by Web application 110 can include a payload.

Testing system 105 is implemented as a data processing system executing suitable testing software. Testing system 105 is configured to test Web application 110 for one or more different types of vulnerability. A "vulnerability," as used within this specification, refers to an instance in which a Web application responds to a request with a response that does not match an expected or model response, thereby demonstrating unexpected behavior on the part of the Web application considered to be a vulnerability or security vulnerability to the type of request (attack) that is issued.

Testing system 105 behaves like a client and interacts with Web application 110. In one aspect, testing system 105, through interacting with Web application 110, e.g., sending requests and receiving responses, determines the infrastructure supporting Web application 110. The interactive process through which testing system 105 determines the infrastructure supporting Web application 110 is represented by infrastructure determination block 125.

Based upon the determined infrastructure, testing system 105 issues one or requests or queries, illustrated as request 130, to one or more different external data sources 115. For example, testing system 105 is configured to access one or more known external data sources such as data source 115. Each external data source 115 represents a repository of vulnerability data, e.g., a Website, Webpage, or the like, through which recently discovered vulnerabilities to Web applications such as Web application 110 are published. In the example illustrated in FIG. 1, each external data source 115 is independent of Web application 110 and testing system 105. For instance, external data source 115 is a third-party Website that is unaffiliated with either testing system 105 or Web application 110.

In response to request 130, external data source 115 sends vulnerability data 135 to testing system 105. Vulnerability data 135 can include one or more Web pages, text, markup language (eXtensible Markup Language (XML), HyperText Markup Language (HTML)), etc. Testing system 105, using vulnerability data 135, derives or otherwise obtains a test payload usable for testing Web application 110. The test payload is intended to exploit (e.g., test for) a particular type of vulnerability within Web application 110. Typically, vulnerability data 135 is well structured and/or defined data that can be parsed and analyzed by testing system 105. Accordingly, testing system 105 is configured to interpret vulnerability data 135 received from each respective external data source that is used or accessed.

Testing system 105 determines the type of vulnerability that the test payload is intended to exploit. In cases where the type of vulnerability is identifiable by the testing system, the testing system further determines whether any validation operations exist. More particularly, testing system 105 determines whether any validation operations for the same or similar type of vulnerability exist therein as part of testing system 105. If so, testing system 105 can initiate an attack upon Web application 110 using the test payload and use the existing validation operation to determine whether Web application 110 is does possess the vulnerability exploited by the test payload (e.g., is vulnerable to the test payload or has a vulnerability to the test payload).

As described, testing system 105 incorporates data relating to recently discovered attacks as published on external data source 115 into black-box testing of Web application 110. The recently discovered attacks are incorporated automatically into the black-box testing process without manual intervention ensuring that even hardcoded testing sequences are kept up to date. Within conventional black-box testing systems, updating the tables and rules typically utilized is a manual and time consuming process requiring a significant amount of developer time and effort. Further, there is no guarantee that end users (e.g., test personnel) will follow-through with downloading the latest updates to testing system 105 prior to conducting black-box testing on Web application 110. Enabling testing system 105 to access external data sources 115 and incorporate vulnerability data 135 as described herein at least partially addresses these concerns.

Figure 2:
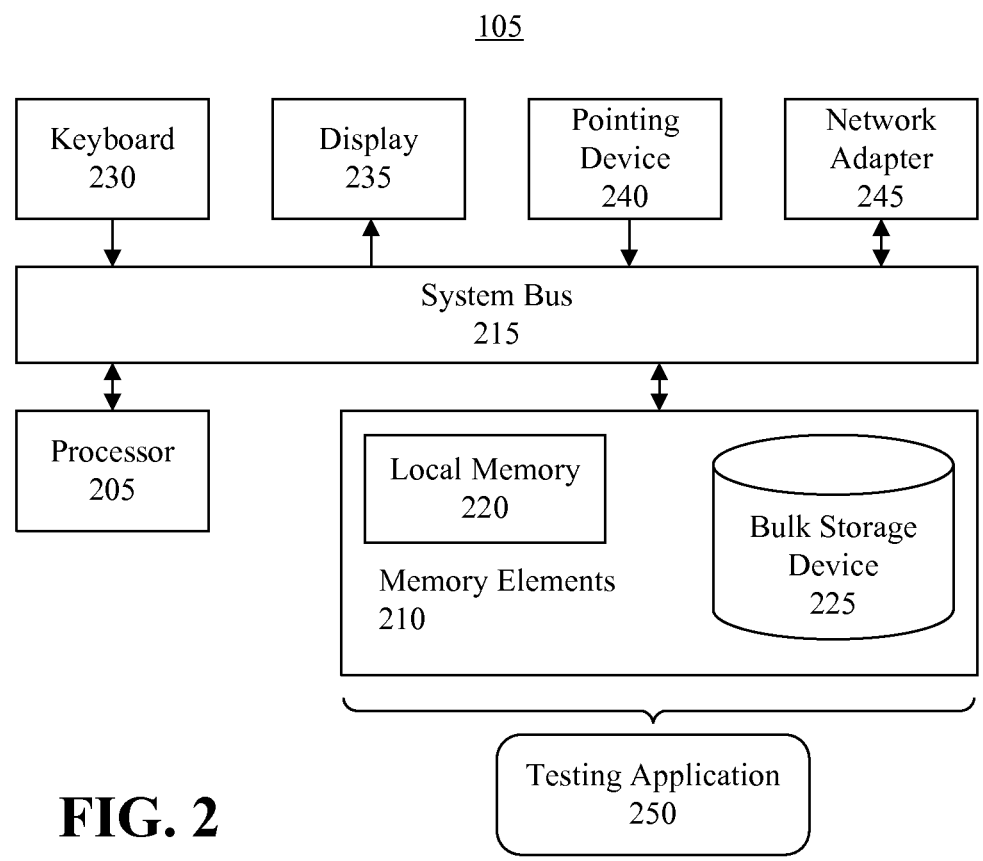
FIG. 2 is a block diagram illustrating an example of a testing system as used within FIG. 1.

FIG. 2 is a block diagram illustrating an example of testing system 105 of FIG. 1. Testing system 105 includes at least one processor 205, such as a central processing unit, coupled to memory elements 210 through a system bus 215 or other suitable circuitry. As such, testing system 105 stores program code within memory elements 210. Processor 205 executes the program code accessed from memory elements 210 via system bus 215. In one aspect, testing system 105 is implemented as a computer or other programmable data processing apparatus that is suitable for storing and/or executing program code. It should be appreciated, however, that testing system 105 can be implemented in the form of any system including a processor and memory that is capable of performing and/or initiating the operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard drive or other persistent data storage device. Testing system 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to testing system 105. The I/O devices can be coupled to testing system 105 either directly or through intervening I/O controllers. One or more network adapters 245 also can be coupled to testing system 105 to enable testing system 105 to become coupled to other systems, computer systems, remote printers, and/or remote storage devices through intervening private or public networks. Modems, cable modems, and Ethernet cards are examples of different types of network adapters 245 that can be used with testing system 105.

As pictured in FIG. 2, memory elements 210 can store a black-box testing application (testing application) 250. Testing application 250, being implemented in the form of executable program code, can be executed by testing system 105 and, as such, can be considered part of testing system 105. In general, testing application 250 specifies the instructions that, when executed, cause testing system 105 to perform the various operations described within this specification. It should be appreciated that while testing application 250 is illustrated as a single application, testing application 250 also can be implemented in the form of two or more applications that execute within testing system 105 cooperatively to implement the various operations described within this specification.

Figure 3:
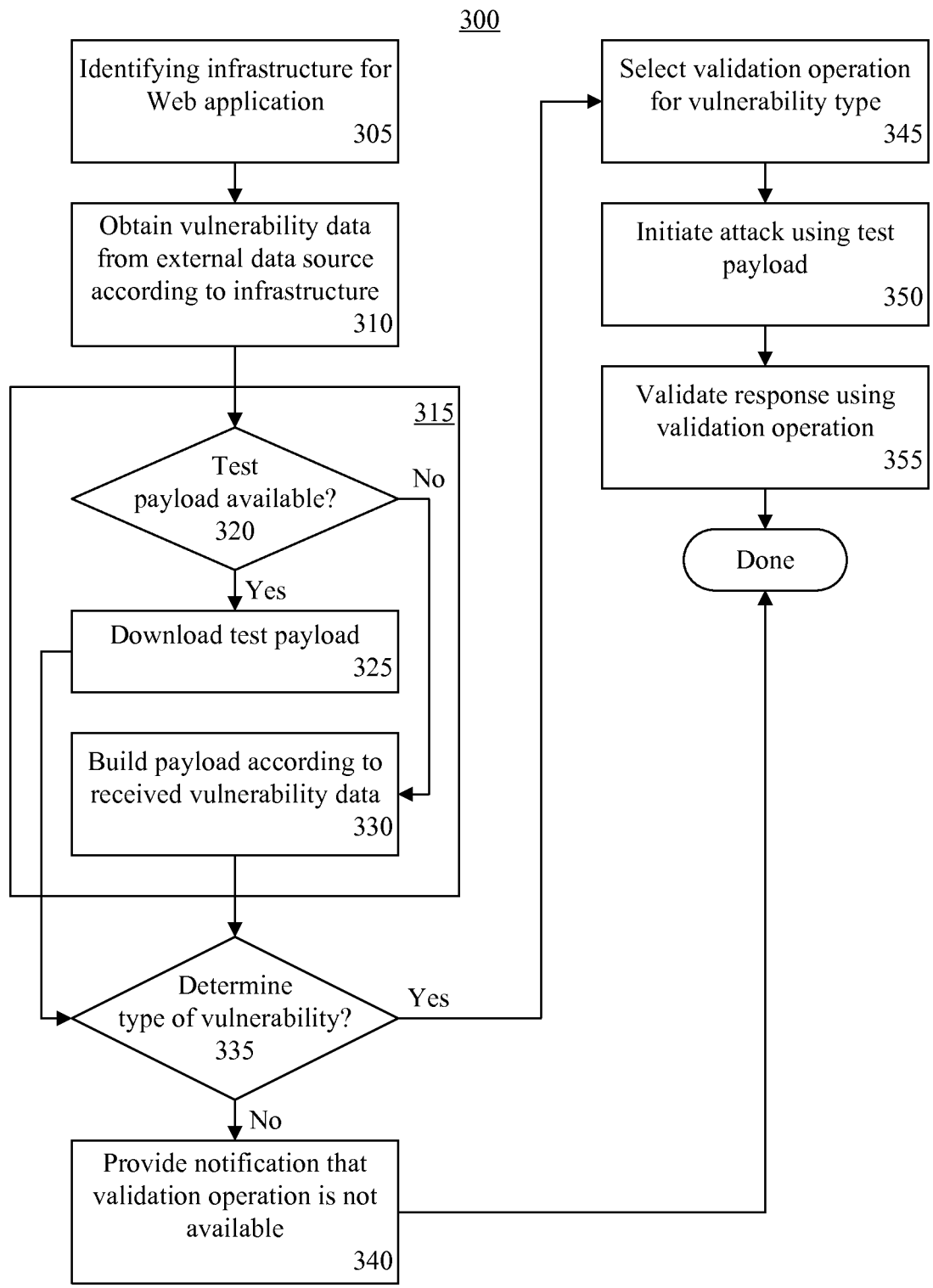
FIG. 3 is a flow chart illustrating an exemplary method of testing a Web application.

FIG. 3 is a flow chart illustrating an exemplary method 300 of testing a Web application. Method 300 is implemented using a testing system operated within a computing environment as described with reference to FIGS. 1 and 2 of this specification. As discussed, the testing system is pre-configured to access one or more known external data sources. For purposes of illustration, method 300 is described in terms of accessing a single external data source. It should be appreciated, however, that more than one external data source can be accessed by the testing system to determine vulnerability data. As such, the particular number of external data sources accessed by the testing system is not intended as a limitation. In any case, method 300 can begin in a state in which the testing system is also configured to conduct black-box testing of a Web application, e.g., the Web application under test.

In block 305, the testing system identifies the infrastructure used to support the Web application. The testing system can submit queries or requests to the Web application and determine one or more attributes from the responses received from the Web application. The various attributes describe or indicate the particular infrastructure used to support the Web application. The process is generally referred to as "fingerprinting" the Web application.

Examples of the attributes that are determined and that define the infrastructure supporting the Web application include the database application that is used by the Web application, the particular HyperText Transfer Protocol (HTTP) or other communication protocol server software used, the Web service or Web application container used, if any, for the Web application, the type of operating system used, or the like. The particular version of each such component also can be determined as an attribute.

As a more specific example, the Structured Query Language (SQL) statements used typically vary from one type or brand of database to another. In such cases, the particular version and/or type of database that is being used can be determined from an evaluation of the SQL received from the Web application in a response. Similarly, a Web server often includes identifying information in an HTTP header of the received response.

By fingerprinting the Web application, the supporting infrastructure, as specified by the determined attributes or "fingerprint," can be used as search criteria when accessing the external data sources to derive test payloads usable for black-box testing the Web application for recently discovered vulnerabilities.

In block 310, the testing system obtains vulnerability data from the external data source according to the infrastructure determined in block 305 for the Web application. The testing system can generate a request or query to the external data source. The request specifies one or more of the attributes defining the infrastructure of the Web application determined in block 305. In this manner, the attributes specifying the infrastructure for the Web application effectively become the search criteria of the request sent by the testing system to the external data source.

The testing system, having advanced knowledge of the external data source to be queried, formulates a suitable request using one or more of the attributes. The testing system sends a request to the external data source over a network. The request, as noted, specifies one or more attributes of the infrastructure as search parameters. The testing system receives vulnerability data over the network responsive to the request from the external data source. The vulnerability data is, therefore, specific to the particular Web application and supporting infrastructure to be tested.

In general, each external data source provides information about exploitable vulnerabilities in various forms. In some cases, the form of the data within the external data source has a well-defined structure, as noted. In such cases, the testing system extracts a test payload intended to exploit a particular type of vulnerability from the external data source. The test payload and the type of vulnerability exploited by the test payload are available from the external data source and accessible by the testing system.

In other cases, the form of the data within the external data source does not have a well-defined structure. Further, the external data source may include an example of the test payload, but lack other information such as the type of the vulnerability that the test payload is intended to exploit. In still other cases, the external data source includes code or text in some language, e.g., programming or instruction language, that is usable (interpretable or executable by a processor) describing how to create a test payload for determining whether a Web application has a particular vulnerability. The external data source may or may not specify the type of the vulnerability exploited by the code.

In block, 315, the testing system begins the process of deriving the test payload that is to be used in black-box testing of the Web application. The testing system, in general, derives the payload from the vulnerability data that is obtained in block 310 from the external data source.

In block 320, the testing system determines whether a payload is available. If so, method 300 continues to block 325. If not, method 300 proceeds to block 330. In block 325, the testing system downloads or retrieves the test payload. In some cases, the external data source that is queried includes actual test payloads that can be downloaded or retrieved by the testing system. If available, e.g., the vulnerability data indicates a match for the request sent by the testing system, in block 325 the testing system downloads the test payload available within the external data source that corresponds to the matched vulnerability data. As an illustration, the external data source can include well defined vulnerability data that can be parsed by the testing system to identify a link included within the vulnerability data from which the test payload is downloaded.

In block 330, the testing system builds a test payload according to the received vulnerability data. Block 330 illustrates an example in which the external data source does not specify or include a test payload that can be downloaded, but provides instructions in the form of code, as described, instead. The testing system builds a test payload according to the code or instructions received within the vulnerability data. For example, the testing system can use symbolic execution to construct the test payload. Symbolic execution is a known technique in which lines of code are interpreted one by one. Symbolic values are tracked. Through the analysis, the testing system constructs a payload in accordance with the analysis of the lines of code.

In one aspect, a payload and/or a response can be built or generated by substituting or replacing a parameter of a known or existing payload within the testing system with a different parameter that is specified within the vulnerability data obtained from the external data source. For example, using a technique referred to as "fuzzying," the test system can include one or more mutatable attack entities. The mutatable attack entities serve as place holders for the payload portion of a request into which a test payload can be inserted. The mutable attack entities are replaced within requests stored within the testing system with a test payload, e.g., an actual test payload that is either obtained or constructed as described herein. As an example, in many cases the testing system already includes one or more requests directed to attacking a particular parameter. In those cases, the parameter, e.g., the payload or a portion thereof, can be replaced with a different parameter within the request resulting in a new test. The substitution technique (e.g., fuzzying) can be applied to varying test payloads in the system to derive new test payloads and/or to generating a response that incorporates a newly derived test payload.

It should be appreciated that the processing described with reference to block 315 is presented for purposes of illustration only. The processing can be performed, for example, in a more automated fashion. For instance, the testing system will know a priori the type of vulnerability data that is provided by each respective external data source that is accessed. Accordingly, the testing system applies the appropriate processing technique according to the particular external data source that is accessed in order to download a test payload or generate a test payload as appropriate as opposed to making determinations as illustrated within block 315 as if such information is not known prior to sending the request for vulnerability data.

In block 335, the testing system attempts to determine a type of vulnerability that is exploited for the test payload. The type of vulnerability indicates the type of attack to which a Web application is vulnerable and that the test payload is intended to exploit. Exemplary types of types of vulnerabilities (and, correspondingly, attacks) include, but are not limited to, cross-site scripting (XSS), code injection (including an SQL injection), buffer overflows, unauthorized access, or the like. It should be appreciated that a large number of different types of vulnerabilities exists and the list provided within this specification is merely illustrated and not intended as a limitation.

In some cases, the testing system searches for keywords within the vulnerability data that indicate a vulnerability type. For example, the testing system can search for instances of words or phrases of known types of vulnerabilities within the text on the pages of the external source data, e.g., within the vulnerability data.

In other cases, keywords are not available or the particular terminology used by the external data source differs from known terminology or from one external data source to another. Accordingly, the testing system can apply a signature verification technique to the payload. The testing system breaks the payload or request into its constituent components and uses signature matching to detect the type of vulnerability the payload is intended to exploit.

In illustration, the testing system determines a signature of the payload as described. A signature is a unique string of bits or a binary pattern of the payload or a portion of the payload (or a test payload as the case may be). The testing system compares the signature of the test payload to signatures of existing payloads within the database of the testing system to determine a match or a closest match. For example, the testing system can search for signatures such as a <script> keyword as a signature that would be indicative of an XSS attack, a "1=1" to detect an SQL injection attack, etc.

If a match is determined, the testing system determines that the test payload is intended to exploit a same type of vulnerability (but not the same vulnerability specifically) as the matched payload. Accordingly, the validation function for the matched payload can be selected and used for validating the response of the Web application when responding to the test payload derived in block 315 during black-box testing. If no match is found, testing using the test payload cannot be performed automatically.

If the testing system determines a vulnerability type, the vulnerability can be exploited for testing purposes and method 300 proceeds to block 345. If not, method 300 proceeds to block 340. In block 340, the testing system outputs a notification that a type of vulnerability for the test payload has been determined and, as such, a validation operation cannot be determined. As used herein, "outputting" and/or "output" can mean storing in memory elements, for example, writing to a file stored in memory elements, writing to display or other peripheral output device, playing audible notifications, sending or transmitting to another system, exporting, or the like. Testing using the test payload is not performed, at least not in an automated manner as described without human intervention.

In block 345, the testing system selects the validation operation for the particular vulnerability type identified in block 335 (or for the matched payload). The validation operation is used to evaluate a response from the Web application to the test payload for the type of vulnerability identified in block 335.

In block 350, the testing system initiates an attack on the Web application using the test payload. The test payload is included in a request and sent to the Web application. For example, the test payload can be included in a request that exists in the testing system by replacing the existing payload (or mutatable attack entity) with the test payload to be used. This presumes that the request in which the test payload is inserted is one used to carry payloads that attempt to exploit a same type of vulnerability as the test payload or is a request used for a payload found to match the test payload in the case of signature analysis. The testing system receives a response to the request from the Web application.

In block 355, the testing system validates the response from the Web application using the validation operation. The validation operation performs any necessary comparisons or analysis on the received response to determine whether the Web application is vulnerable to the attack using the test payload.

Method 300 illustrates a technique to be used in testing a Web application for recently discovered vulnerabilities. As such, method 300 can be used in combination with various other testing techniques to supplement existing tests with tests for newly or recently discovered vulnerabilities to improve the testing that is performed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method of updating a testing system that performs vulnerability testing on a Web application, comprising:
   identifying, for the Web application to be tested, infrastructure data characterizing an infrastructure of the Web application;
   submitting, to an external data source unaffiliated with the testing system or the Web application and using the identified infrastructure data, a search request that specifies the infrastructure data;
   receiving, from the external data source, search results derived from the infrastructure and including vulnerability data indicating recently discovered vulnerabilities to Web applications;
   deriving, from the vulnerability data, a test payload;
   updating a test sequence configured to test the Web application using the test payload derived from the vulnerability data; and
   testing the Web Application using the updated test sequence.

2. The method of claim 1, wherein
the vulnerability data is obtained from a plurality of external data sources.

3. The method of claim 1, wherein
the infrastructure data is obtained by the testing system by querying the Web application and determining the infrastructure data based upon responses to the querying.

4. The method of claim 1, wherein
the vulnerability data includes the test payload.

5. The method of claim 1, wherein
the vulnerability data does not include the test payload, and
the test payload is built by the testing system using the vulnerability data.

6. The method of claim 5, wherein
parameters within a preexisting payload within the testing system are modified to build the test payload.

7. The method of claim 1, wherein
the updating is performed without manual intervention.

8. The method of claim 1, wherein
a type of vulnerability exploited by the test payload is derived from the vulnerability data.

9. The method of claim 8, wherein
a preexisting validation operation within the testing system is identified based upon the type of vulnerability, and
the test sequence is updated to include the validation operation.

10. The method of claim 8, wherein
a validation operation within the testing system is not identified for the type of vulnerability, and
the testing system outputs a notification indicating that the validation operation for the type of vulnerability is not identified.

* * * * *